E. A. SPERRY.
SYSTEM OF GUNFIRE CONTROL.
APPLICATION FILED OCT. 10, 1914.

1,356,505.

Patented Oct. 19, 1920.
4 SHEETS—SHEET 1.

WITNESSES:
E. J. Thompson
E. W. Chafee

INVENTOR.
ELMER A. SPERRY.
BY Herbert H. Thompson
ATTORNEY.

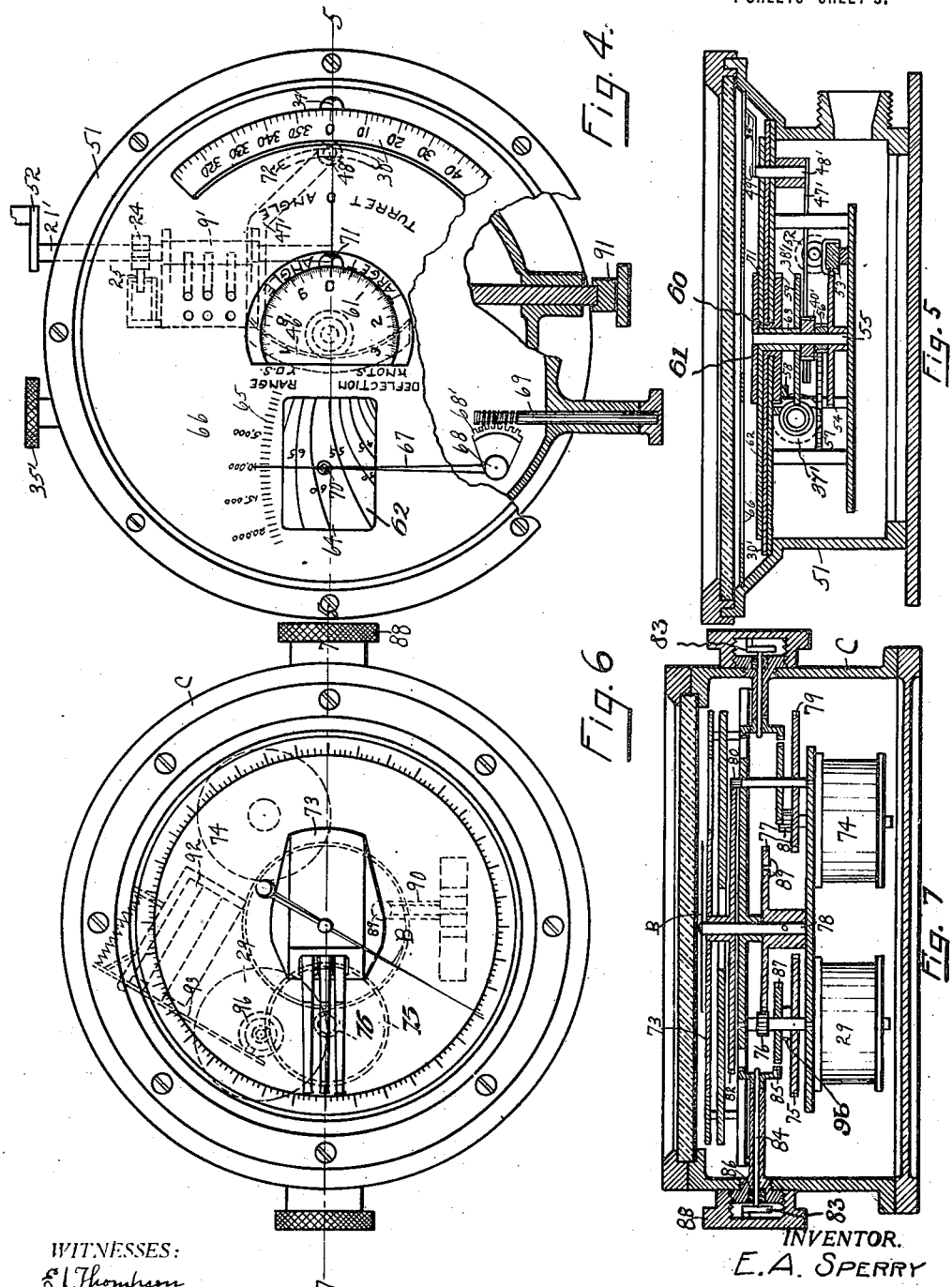

E. A. SPERRY.
SYSTEM OF GUNFIRE CONTROL.
APPLICATION FILED OCT. 10, 1914.
1,356,505.  Patented Oct. 19, 1920.
4 SHEETS—SHEET 4.
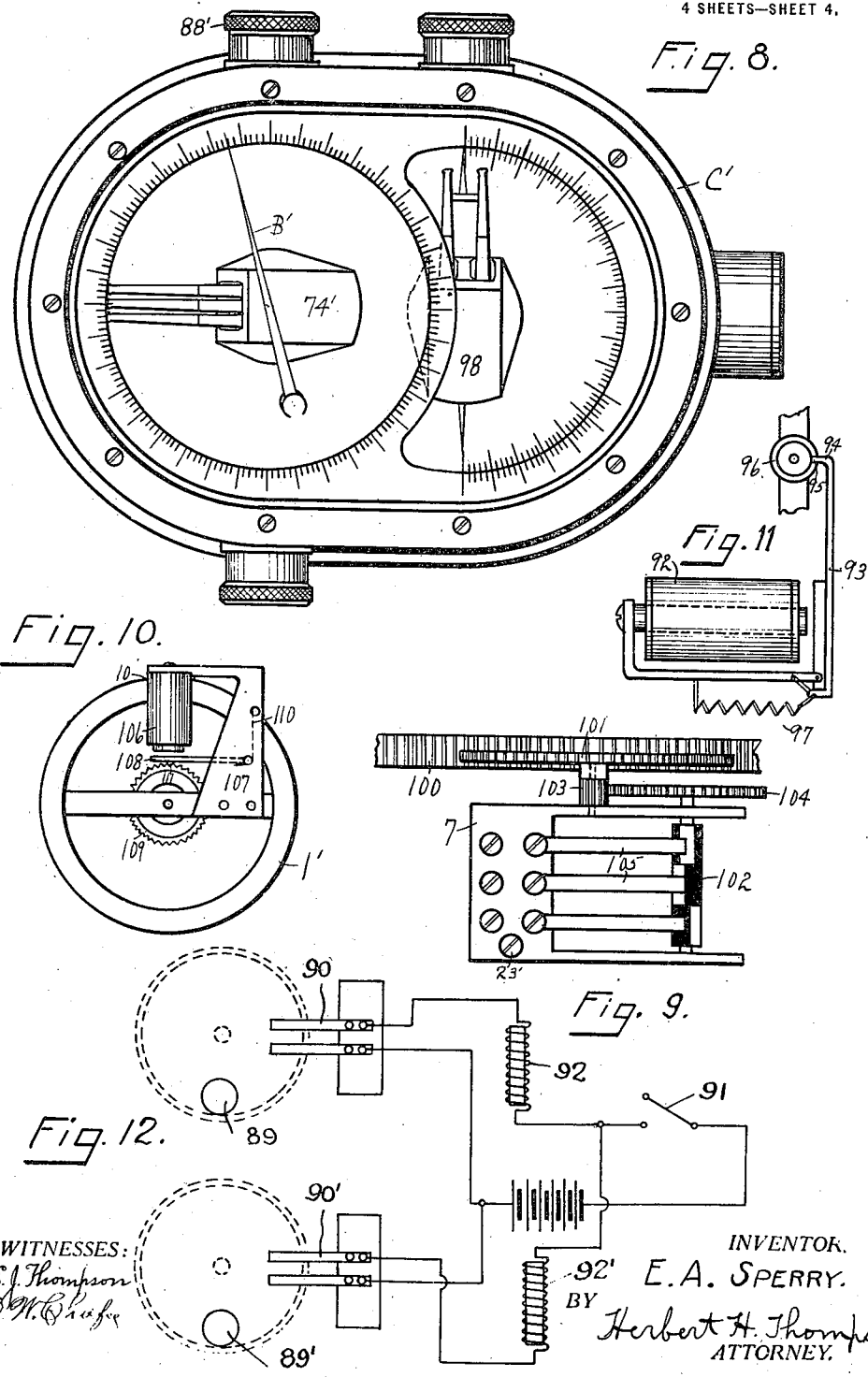
WITNESSES:
E. J. Thompson
D. W. Chafee
INVENTOR.
E. A. SPERRY.
BY Herbert H. Thompson
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKYLN, NEW YORK, A CORPORATION OF NEW YORK.

SYSTEM OF GUNFIRE CONTROL.

1,356,505.  Specification of Letters Patent.  Patented Oct. 19, 1920.

Application filed October 10, 1914. Serial No. 866,011.

*To all whom it may concern:*

Be it known that I, ELMER A. SPERRY, citizen of the United States, residing at Brooklyn, New York, have invented a new and useful Improvement in Systems of Gunfire Control, of which the following is a specification.

This invention relates in general to a signaling system, especially adapted for use on a warship to notify the gunners of the position of the target from the control station on the ship, to facilitate the training of the guns in the indicated direction, to indicate to the control station the position of the guns, and to notify both the gunners and the control station when one turret is about to interfere with another.

My invention seeks to provide an absolute check on the gunner, whereby firing at the wrong target, or firing dangerously close to another turret, is rendered impossible.

My invention also provides means whereby guns may be accurately aimed without sighting from the turret.

The complete system may, if desired, incorporate the instrument which forms the subject matter of my co-pending application, Serial Number 859,329, filed August 31, 1914, as a unitary part thereof, as will be evident as the description proceeds.

The embodiment of my invention which I now prefer is illustrated in the accompanying drawings, in which:

Fig. 4 is a plan view of a modified form of the transmitting portion of the central station instrument which is also adapted to be used in connection with said instrument.

Fig. 5 is a vertical section thereof, on line 5—5.

Fig. 6 is a plan view of the instrument I term the target turret indicator.

Fig. 7 is a vertical section thereof on line 7—7.

Fig. 8 is a plan view of a modified form of target turret indicator.

Fig. 9 is an enlarged detail of a transmitter actuated by the rotation of the turret.

Fig. 10 is a plan view of one of the repeater motors used in the indicators, showing the brake mechanism used in connection therewith.

Fig. 11 is a detail of the stop device used in setting or synchronizing the various instruments.

Fig. 12 is a wiring diagram illustrating the operation of the automatic stops used in initially setting or synchronizing the various instruments.

Figure 1:
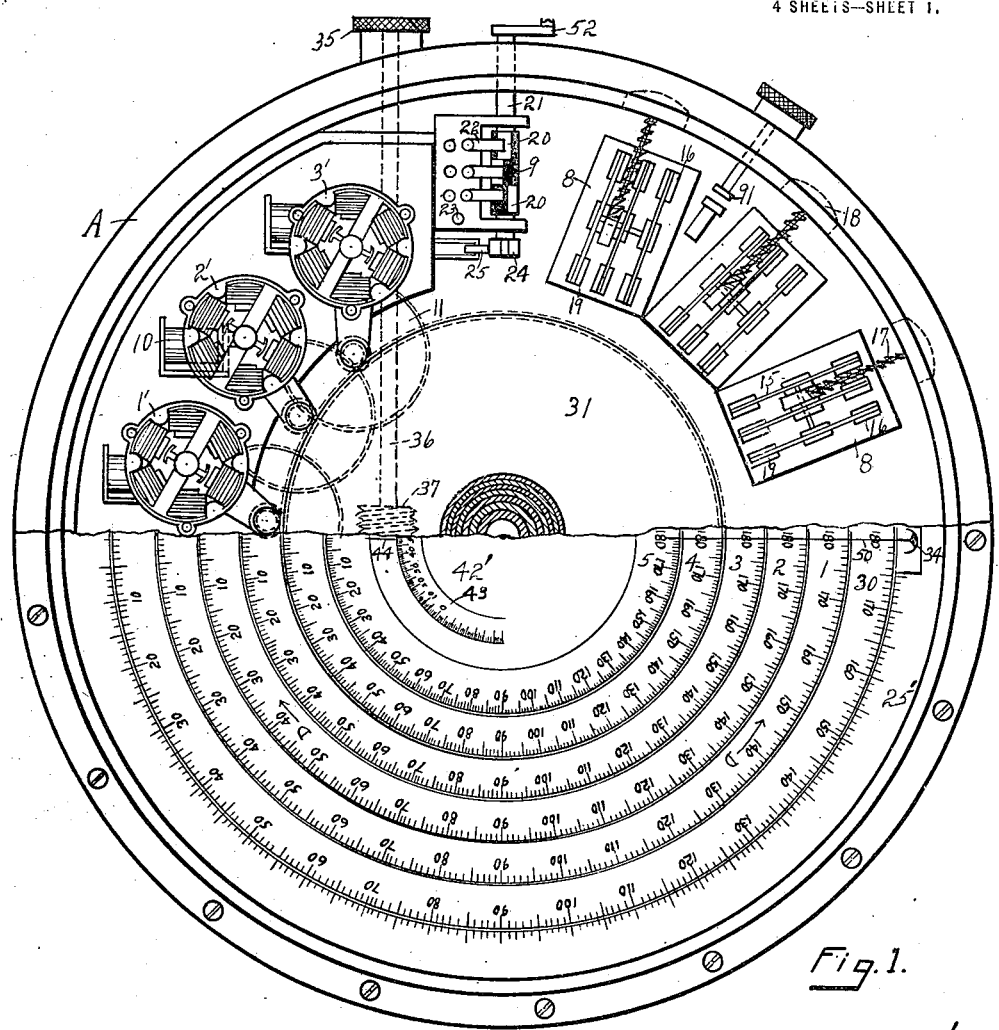
Figure 1 is a plan view, partly in section, of the instrument which I term the central station instrument.
Figure 2:
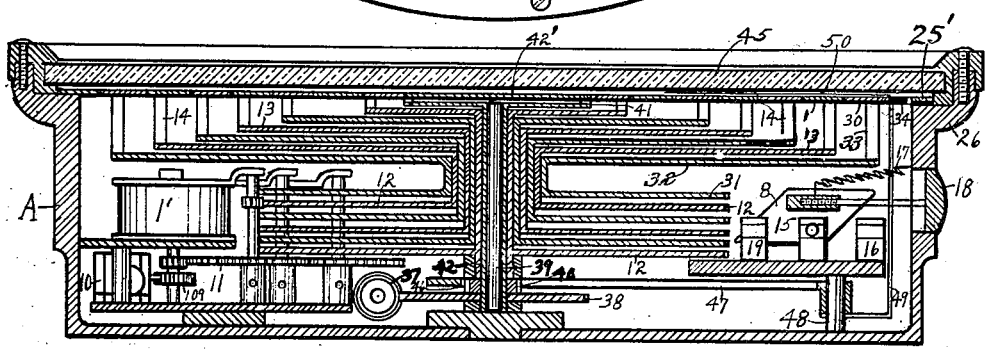
Fig. 2 is a sectional view of the same.

Referring specifically to the drawings, my invention comprises essentially two sets of instruments, one of which is designed to be located in the central or control station of the ship, while the other set comprises a number of instruments, one of which is located in each turret of the system.

The central station instrument A in its preferred form combines the functions of a sending instrument and receiving instrument or indicator. As shown it comprises a plurality of rotary indicating means, shown as graduated dials 1, 2, 3, 4, 5 and 30, concentrically mounted. Each of these dials is maintained at a fixed position with respect to one of the turrets in the system so as to indicate its position in the central station. To accomplish this, each turret is provided with an electrical transmitter 7, which is actuated by rotation of the turret. These transmitters may assume any form and are diagrammatically shown in Fig. 3 as a plurality of contacts which are brought into contact successively by rotation of the turret. The transmitters may assume the form shown in Fig. 9.

Numeral 100 denotes a section of an internal gear on the turrets. The transmitter 7 is provided with a gear 101 meshing with said gear 100. Commutator 102 is driven from gear 101 through pinion 103 on the same shaft as gear 101, and gear 104 on the commutator shaft. Brushes 105 are used to take the current off the commutator. The construction of the commutator is the same as that of transmitter 9 and is described in detail hereinafter. Its action, however, is the same as that of the three contacts shown in Fig. 3.

Figure 3:
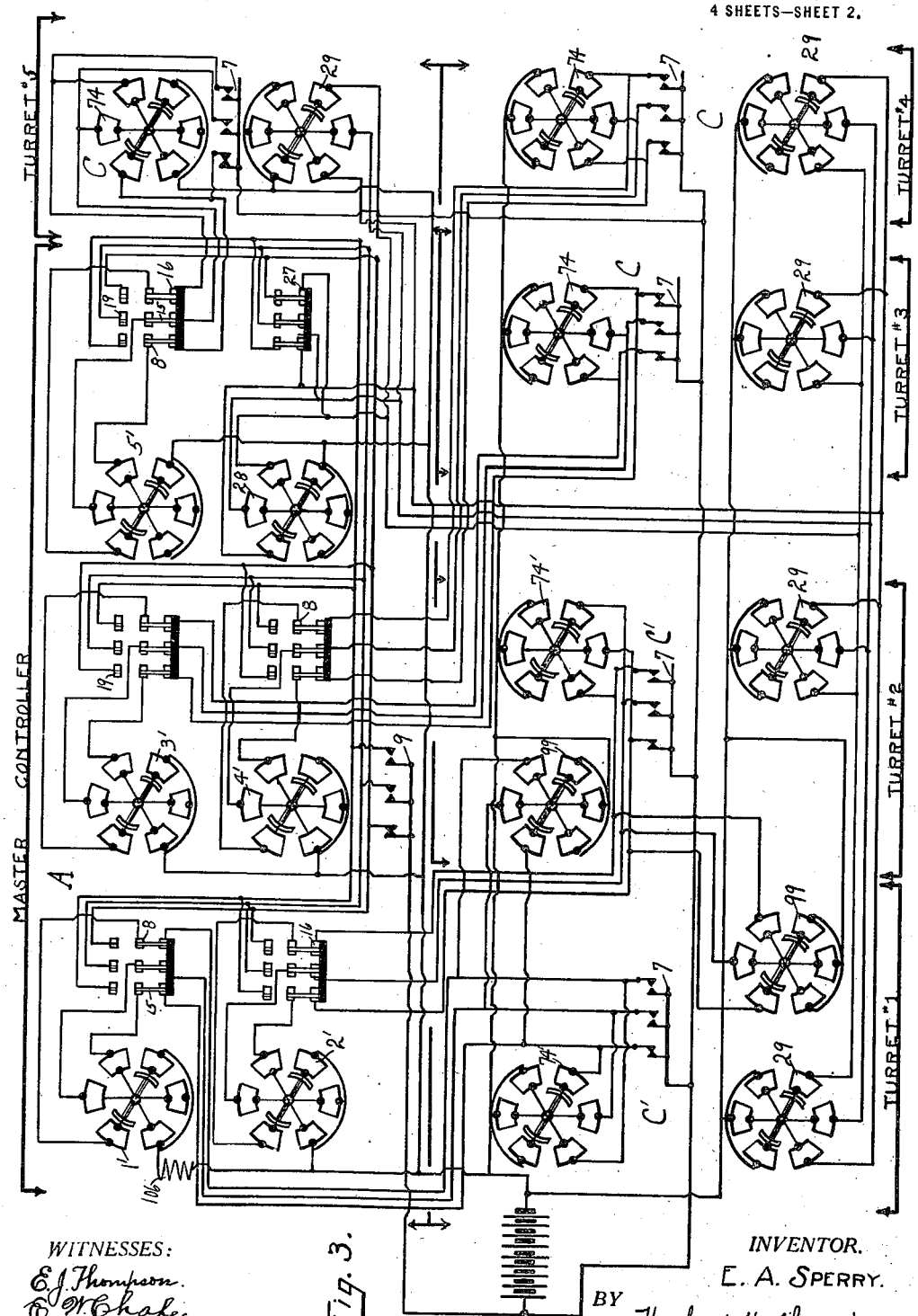
Fig. 3 is a diagrammatic outlay of my signal system, as applied to a five-turret ship.

The transmitter 7 in turret #1 is electrically connected to repeater motor 1' which drives the dial 1, so that dial 1 will indicate continuously the position of turret #1. Similarly, the other transmitters 7 are connected to their respective repeater motors 2', 3', 4', and 5'. Double throw switches 8 are interposed between the transmitters and their respective motors in order that the dials may be electrically set from the hand operated transmitter 9 within the master controller. The switches are shown as consisting of three pivoted knives 15, which are normally held in engagement with contacts 16 by tension springs 17, thus connecting the motors 1', 2', 3', 4' and 5' with the transmitters 7. A push button 18 is provided for each switch, whereby the knives 15 may be disengaged from contacts 16 and engaged with contacts 19. By referring to Fig. 3 it will be seen that this will connect a given motor with the hand transmitter 9. The transmitter is shown in Fig. 1 as a three section rotatable commutator, each section being provided with two diametrically opposite 90° conducting strips 20 separated by insulation, but grounded to the shaft 21. The strips are placed 30° ahead on each section and the current is taken off through three brushes 22 and the common post 23. In Fig. 3 the transmitter is shown diagrammatically as three pairs of contact points, each of the members of the different pairs making contact successively. The diagram is intended to show the method of operation of the complete transmitter shown in Fig. 1. The shaft 21 (Fig. 1) is also provided with a notched collar 24, against which a spring pressed roller 25 is adapted to bear. The purpose of this construction will appear hereinafter.

The repeater motors may be of any type to correspond to the type of transmitters used. They are shown as six pole machines, to correspond to the three part transmitter 9. Preferably, each of these motors is equipped with a brake or stop mechanism 10, to prevent the dials from being rotated when their motors are not energized by friction between the sleeves. Fig. 10 shows the preferred form of stop, comprising an electro-magnet 106 connected in series with the repeater motor (see Fig. 3), and supported from a bracket 107 secured to the motor frame. The armature 108 of the magnet is pivoted on bracket 107 and is normally pressed into engagement with a serrated collar 109 on the motor shaft by a spring 110. Said armature is provided with a tooth 111 to engage the serrations. It will be seen that when the motor is energized, magnet 106 will draw armature 108 out of engagement with collar 109, leaving the motor free to operate but that when the motor is not energized, it will be locked against rotation. In Fig. 3, only one of the repeater motors (1') is shown as provided with the solenoid 106, the other solenoids being omitted for the sake of simplifying the diagram.

Each motor is connected through reduction gearing 11 to one of the concentrically mounted gears 12, the hubs of which are made in the form of interfitting sleeves. On the upper end of these hubs are secured a series of disks 13, which support by means of posts 14 the dials 1, 2, 3, 4 and 5. A fixed graduated ring 25' is secured to the casing 26 of instrument A to coöperate with the rotatable dials.

It will be seen that that part of the system so far described furnishes a ready means whereby the control station may be kept informed of the position of each turret, the instrument showing at a glance whether all the turrets are on the correct target. If all the turrets connected to the instrument are in the same group, that is if they are all to fire at the same target, the readings on all of the dials should correspond, while if more that one group is provided those in the same group should all read the same. The latter system is shown in Fig. 3.

My invention also provides means whereby the turret operators may be informed of the bearings of the target. This part of the system is in intimate coöperation with the part above described and comprises essentially a target bearing transmitter adapted to be located in the central station adjacent to or as a part of said instrument A, and target bearing indicators B located in each turret of the group, the target bearing being transmitted to the central station from the target bearing telescope by any suitable means.

Fig. 1 shows the preferred form of instrument, which combines the target bearing transmitter and the turret position indicators, whereby a novel coöperation is secured. That portion which composes the target bearing transmitter includes preferably the same transmitter 9, which is used in setting the dials 1 to 5. The diagram in Fig. 3 shows this transmitter in a diagrammatic manner as explained above connected to a switch 27, which may be of construction similar to switches 8, but which need be only a single throw switch. When the switch is in, transmitter 9 is connected to repeater motor 28 in the master controller and also to repeater motors 29 in each of the turrets. Motor 28 drives an indicating dial 30, through a gear 31, disk 32 and posts 33, similar in every respect to gears 12, disks 13 and posts 14. Preferably a movable reference pointer 34 is provided on which dial 30 is to be read, so that by shifting said pointer the proper amount, to correct for the drift of the projectile, a correct reading may be transmitted to the turrets. The shifting of the pointer the precise amount required is accomplished through a turn button 35 mounted on a shaft 36 which carries a worm 37. A worm wheel 38 journaled on the central shaft 39, meshes with said worm and drives pinion 40 and the disk 41 through the sleeve 42'. Disk 41 carries a second disk 42' on which is engraved an arbitrary deflection scale 43, designed to be read in connection with any fixed mark such as line 44 on the glass cover 45. Pinion 40 meshes with an internal gear sector 46 on an arm 47 pivoted on a fixed post 48, and carrying a rod 49 which supports the pointer 34. Said pointer is preferably equipped with a needle 50 extending across the turret position indicators, so that the operator may see at a glance whether all the turrets have been brought to bear on the target.

It is obvious that the details of the instrument A may be varied. For instance, it is immaterial whether dial 30 be provided with circular graduations reading on the reference pointer 34 or whether said dial is merely provided with a pointer to read on a circular scale made upon a dial secured to pointer 34. Also Figs. 4 and 5 show a modification in which the target bearing transmitter is made up as separate instrument, 51. This instrument is also designed to be used in connection with instrument A in case the turrets connected with A are separated into groups. Thus if turrets #1, #4 and #5 were in one group and turrets #2 and #3 in another group, transmitter 9 would be used to actuate the indicators of one group while the transmitter in instrument 51 would actuate the indicators of the other.

Similar parts are correspondingly numbered, but certain changes are introduced. The handle 52 which is used to operate the transmitter 9' through shaft 21', operates in instrument 51 the scale 30' mechanically, instead of through a repeater motor, as by mounting a bevel gear 152 on shaft 21', which drives an idler 53 meshing in turn with a gear 54, secured to the central shaft 55. Also secured to said shaft is a pinion 56 driving a pair of reduction gears 57 and 58, the latter of which drives gear 59 which is secured to the sleeve 60 carrying the disk on which scale 30' is engraved. Also secured to shaft 55 is a second disk 61, which, it will be seen, may be used to increase the accuracy of the readings on the main scale, as it rotates much faster, being designed in the embodiment shown to make one revolution for each ten degrees of dial 30'.

For correcting the target bearings for drift, etc., I have shown a calculating device whereby the instrument may be set so as to make the proper correction, if the range and speed of the vessel are known, so that the necessity for a separate calculation such as is required when using the arbitrary deflection scale of Fig. 1 is dispensed with. The operating knob 35' which applies the correction to the reference pointer 34', through means hereinafter described, also rotates a specially graduated plate 62 by any suitable means, such as through a worm 37' and worm wheel 38', which is secured to a sleeve 63 on which plate 62 is mounted. Curves 64 are laid out on said plate from plotted results of experiments in gun fire under varying conditions of range and relative speeds of the ship and target. A scale 65 is graduated on cover plate 66 representing the range in yards.

A pointer 67, pivoted at 68 and operated by worm sector 68' through the screw shaft 69, reads on scale 65 and carries a second pointer 70 for coöperating with scale 65. The curve marked 50 on said scale is marked out on the basis of the ship and the target moving at the same speed and so that when the pointer 67 is set on the proper range, the proper correction will be applied to the pointer 34' when plate 62 is rotated so that pointer 70 rests on curve 50. Curve 55 is similarly laid out, but is on the basis that the ship is moving five knots faster than the target, while curve 45 represents the conditions when the ship is moving five knots slower than the target. Of course the curves 64 are merely illustratory and it will be understood that their character may be varied widely within the scope of this invention.

In addition to reference pointer 34', I provide another such pointer 71 to coöperate with the scale 61, which may be termed a micrometer scale. The actuation of these pointers from knob 35' is accomplished by means of worm wheel 38', mentioned above, to which is secured pinion 40'. An arm 47' carrying an internal gear meshing with said pinion, is pivoted on post 48', which extends through a slot 72, and carries a rod 49' supporting pointer 34'. Pointer 71 may be graduated on the same plate 62 which carries curves 64. It will readily be seen that the micrometer pointer 71 receives a motion of much greater magnitude than pointer 34', since the radius of arm 47' is much greater than that of pinion 40', the parts being so designed that the ratio of angular velocity of scales 61 and 30' is the same as the ratio of angular velocities of pointers 71 and 34', and so that the two pointers will reach the zero deflection position simultaneously (see line O).

The cover plate 66 is shown as hiding the greater part of scales, but a rectangular piece is cut out to show curves 64, and a central segment to show scale 61 and pointer 71, while an arc shaped piece is removed to show scale 30' and pointer 34'.

The details of the instrument which I term the target turret indicator will now be considered. It will be remembered that it constitutes essentially a repeater motor 29 connected in some way to an angle indicator such as pointer B which indicates the target bearings. I prefer, also, to combine with said target bearing indicator a turret position indicator, the whole forming the instrument C shown in Figs. 6 and 7, which I term a target turret indicator. One of these instruments is placed in each of the turrets of the group, as shown in Fig. 3. The turret position indicator which may be in the form of a pointer or model 73 is mounted concentrically with pointer B, so that the turret officer has a means whereby he may train his turret directly on the enemy by bringing the two indicators into juxtaposition. Pointer 73 is shown as actuated from a repeater motor 74, which may be controlled by the same turret transmitter that controls motor 1', 2', 3', 4', or 5'. The mechanical construction of instrument C is as follows:

Motor 29 drives reduction gears 75 and 76 through a pinion (not shown) on the motor shaft which meshes with the former gear. Gear 76 drives a gear 77, pinned to the central shaft 78, which carries adjacent its upper end the pointer B. Motor 74 drives reduction gears 79 and 80 through pinion 81, gear 80 being in the form of teeth cut on the shaft of gear 79 and meshing with the large gear 82. On the hub of gear 82 is secured the position indicator 73.

In order to set the indicators in the proper position with respect to the turrets, when the indicator is being set up or in order to correct it in case it should fall out of step, local synchronizers in the form of setting handles 83 are provided for the dials. Each handle is mounted on a shaft 84 carrying adjacent its other end a crown gear 85. A spring 86 normally holds gear 85 out of mesh with gear 87, mounted on the same shaft as the reduction gearing of each group, but by pushing in on the proper handle 83, a crown gear 85 can be brought into mesh with one of said gears 87, and the indicator rotated by hand. Screw caps 88 may be provided to cover said handles 83, preventing accidental operation thereof.

As a further means for setting the pointer B properly, an electric stop is provided which operates to lock the pointer when it has reached a predetermined position, thereby providing a long distance synchronizer which sets directly from the target bearing transmitter. This means comprises a button 89 mounted on gear 77, which wipes over a pair of fingers 90 fixed on the frame. When the button is in the position shown in Fig. 6, a circuit is completed through the fingers. In the same circuit with the fingers 90 is a hand operated switch 91 (see Figs. 1, 4 and 12) on or associated with the instrument A (Fig. 1) or the sending instrument shown in Fig. 4, so that the circuit will only be closed when both switches are closed. The circuit is arranged to operate an electromagnet 92, the armature 93 of which carries a pin 94 adapted to engage in a notch 95 in a collar 96 on the shaft of the motor 29, when the magnet is energized. A spring 97 holds the pin 94 normally out of said notch. In order then, to lock the dial, not only must the gear 77 carrying the button 89 be in a predetermined position and the switch 91 on the indicator be closed, but also the motor shaft must have assumed such a position that the notch 95 is under the pin 94. This enables the pointer B to be adjusted with a great degree of accuracy, since the motor is connected so that one of its steps equals only a very small arc of movement of the pointer, while the pin and notch insure the locking of the motor at exactly the correct position.

To set all of the pointers B in the same known position the operator of the sending instrument closes switch 91 and rotates transmitter 9 until the pointers have finished at least a complete revolution. As the pointers revolve, however, the notch 95 on the motor shaft will continually pass under finger 94 and in time the button will close the circuit between fingers 90 and cause the excitation of the magnet 92 as soon as switch 91 is closed. This will lock the motor and pointer B as soon as the notch 95 comes under the finger 94 and all of the indicators B will be locked in a predetermined and known position, such as the zero position on the dial. After the indicators B are so locked, the operator continues to rotate transmitter 9 until the indicator 30 assumes the same position at which pointers B are known to be locked. As soon as this position is obtained switch 91 is opened, but the transmitter circuit left closed so that the pointers will follow the movements of the indicator 30. The operator may then bring the indicator and with it the pointers B to the desired position; or in other words, to show the true target bearing.

In case the ship on which my system is installed contains interfering turrets, that is turrets which if fired in certain positions will injure another turret on the ship, I prefer to employ the target turret indicator shown in Fig. 8, which shows not only all that indicator C shows but also indicates graphically when the turrets approach the danger zone. In the typical outlay shown in Fig. 3, I have shown two of the turrets equipped with a multiple turret target indicator C', while the other three are provided with the single turret target indicator C. Indicators C' are similar in construction to indicator C, but contain in addition a pointer 98 which indicates the position of the adjacent interfering turret. A repeater motor 99 operates this pointer through connections similar to those between indicating members B and 73 and their motors. Pointer 98 is positioned with respect to indicating members B' and 74' so that their paths of movement will intersect throughout the danger zone. Said repeater motor 99 is actuated from a transmitter in the adjacent turret, preferably the same transmitter 7 which operates the position indicator 74' in that turret, and the position indicator for that turret in the central station, as shown in Fig. 3.

Of course, if there are more than two interfering turrets, a corresponding increase in the number of dials used in each turret would be provided.

The general operation and advantages of my system are as follows:—

Upon being notified of the arbitrary deflection to be given the guns and of the bearings of the target, the fire control officer in the central station sets the arbitrary deflection scale 43 to the proper reading by rotating button 35 and then rotates handles 52 until the dial 30 shows the proper bearings in connection with the movable reference pointer 34. As he does this the pointers B or B' in each of the turrets will be brought to the exact position in which the guns should be aimed, by the repeating system. That is, they will not be brought to bear directly on the target but will be aimed so as to hit the target, due to the proper adjustment of pointer 34.

The turret officers will then cause their turrets to be brought around so that the turret position indicator 74 and 74' in each turret will lie directly under the target indicator B. While this operation is taking place, the position indicators 1, 2, 3, 4 and 5 of the master controller are also following their respective turrets, indicating to the fire control officer whether or not the turrets have been brought to bear on the target. The guns may then be fired either with or without sighting from the turret itself.

Interference between the turrets is immediately detected both by means of the multiple turret indicators C' and by means of the master controller. For instance, if turrets #1 and #2 interfere when #1 is between 135° and 225° and #2 is between 315° and 45°, this fact could be noted on the dials, as by coloring them distinctively between these degrees, or by marking them as indicated in Fig. 1.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Thus it will be understood that the apparatus discussed herein is adapted for many different arrangements other than illustrated in Fig. 3. Thus, if desired, more than one target turret indicator such as shown in Fig. 6 or Fig. 8 may be employed in one turret. For instance, a multiple turret indicator such as shown in Fig. 8 may be furnished the turret officer in the turret, while the turret trainer may be provided with an independent single target indicator such as shown in Fig. 6. Other arrangements will readily occur to those skilled in the art.

Having now described my invention, what I claim and desire to secure by Letters Patent is:

1. In a system of gun fire control, a sending instrument adapted to be set to show the direction in which the guns should be aimed, target indicators in each turret controlled at a distance from said instrument, and turret position indicators mounted to coöperate with said instrument, controlled at a distance from the several turrets.

2. In a system of gun fire control, a sending instrument comprising a transmitter adapted to control an indicator in a turret, an indicating element connected with said transmitter adapted to be set to indicate the direction in which said turret should be aimed, and a second indicating element adapted to indicate the actual direction in which said turret is placed, mounted adjacent said first mentioned element.

3. A tell-tale system for interfering turrets comprising a position indicator in each turret operated by its turret, a position indicator operated by each of the other interfering turrets located in each turret, and a plurality of position indicators concentrically mounted in a control station so as to be read in conjunction, and operated individually from said turrets.

4. In a system of gun fire control, the combination with a turret transmitter, of a tell-tale indicator adapted to be placed in the central station of a ship, comprising a plurality of coöperating rotary indicators, a repeater motor connected to each indicator, a synchronizing transmitter, and a switch between each motor and its actuating turret transmitter adapted to disconnect it from said turret transmitter and to connect it with said synchronizing transmitter.

5. In a system of gun fire control, an instrument comprising an indicator adapted to be set to indicate the correct turret angle for firing, and a plurality of turret position indicators mounted so as to be read in conjunction with said first named indicator and with each other.

6. In a system of gun fire control for a plurality of turrets, of an indicator adapted to be set to indicate the correct turret angle for firing, a transmitter connected with said indicator adapted to control indicators in said turrets, and a plurality of turret position indicators adapted to be actuated from said turrets and mounted so as to be read in conjunction with said first named indicator and with each other.

7. In a system of gun fire control for turrets and the like, an instrument adapted to be located at a distance therefrom comprising an indicator adapted to be set to indicate the correct turret angle for firing, a transmitter connected with said indicator adapted to control indicators in said turrets, and a turret position indicator adapted to be actuated from said turret and mounted so as to be read in conjunction with said first named indicator.

8. In a system of gun fire control for turrets, an instrument, comprising a plurality of repeater motors adapted to be controlled from the turrets, a transmitter, adapted normally to control target bearing indicators in the turrets, a repeater motor also normally controlled from said transmitter, and switches for disconnecting said transmitter from said indicator and motor circuit and for connecting it with said first named repeater motors, whereby said transmitter performs both the function of a target bearing transmitter and a synchronizing transmitter.

9. In a system of gun fire control, the combination with a plurality of turrets, each provided with target bearing indicators, an instrument comprising a rotary device adapted to be set to show the true bearings of the target, transmission means between said device and the target bearing indicators in the turrets, and a movable reference indication for said indicator adapted to be set to correct for the deflection of the shell, whereby, when said device is set on the correct target bearings, said indicators will show the true turret angle for firing.

10. A gun fire control system, comprising a target bearing transmitter and a plurality of turret position indicators located in the central station on the ship, a position indicator in each turret and a target bearing indicator operated from said transmitter adjacent said position indicator in each turret.

11. A gun fire control system, comprising a target bearing transmitter and a plurality of turret position indicators located in the central station of the ship, a position indicator for each turret, a target bearing indicator operated from said transmitter for each turret and a transmitter operated by each turret in circuit with said first mentioned indicators.

12. A gun fire control system, comprising a target bearing transmitter and a plurality of turret position indicators located in the central station of the ship, a position indicator for each turret, a target bearing indicator operated from said transmitter for each turret and a transmitter operated by each turret in circuit with both one of said first mentioned position indicators and the indicator within its turret.

13. In an indicator system for warships, the combination with a plurality of turrets of a transmitter connected with each turret, a target bearing transmitter, a receiving instrument comprising a plurality of turret position indicators positioned so as to be conjointly readable, each indicator being driven by one of the said turret transmitters, and an indicating device in each turret, comprising a turret position indicator driven from the transmitter of the containing turret and a target bearing indicator driven from said bearing transmitter, the indicators of said device being conjointly readable.

14. In an indicator system for warships, the combination with a plurality of turrets, of a transmitter connected with each turret, a receiving instrument comprising a plurality of turret position indicators positioned so as to be conjointly readable, each indicator being driven by one of said turret transmitters, and an indicating device in each turret comprising a turret position indicator driven from the transmitter of the containing turret and a second turret position indicator in interfering turrets driven from a transmitter in an interfering turret, the indicators of said device being conjointly readable.

15. In an indicator system for warships, the combination with a plurality of turrets, of a transmitter connected with each turret, a target bearing transmitter, a receiving instrument comprising a plurality of turret position indicators positioned so as to be conjointly readable, each indicator being driven by one of the said turret transmitters, and an indicating device in each turret, comprising a turret position indicator driven from the transmitter of the containing turret, a second turret position indicator driven from a transmitter on an interfering turret, and a target bearing indicator driven from said bearing transmitter, the indicators of said device being conjointly readable.

16. In a system of gun fire control, the combination with a plurality of turrets, each provided with a target bearing indicator, an instrument comprising a rotary device adapted to be set to show the true bearings of the target, transmission means between said device and the target bearing indicators in the turrets, and a movable reference indication for said instrument adapted to be set to correct for the deflection of the shell, whereby when said device is set on the correct target bearings, said indicators will show the true turret angle for firing.

17. In a system of gun fire control, a repeater motor, a target bearing indicator driven thereby, a transmitter located at a distance for actuating said repeater motor and adapted to transmit the target bearings, and means for altering the reading of said target bearing indicator to correct for deflection of the shell by adjustment of said transmitter.

18. In a system of gun fire control, an indicating instrument comprising a rotary indicator adapted to be set to show the true bearings of the target, a movable reference device for said indicator adapted to be set to correct for the deflection of the shell, a transmitter connected to said indicator, and a receiving instrument actuated from said transmitter.

In testimony whereof, ELMER A. SPERRY, has signed his name to this specification in the presence of two subscribing witnesses, this 8th day of October, 1914.

ELMER A. SPERRY.

Witnesses:
ALBERT W. STRINGHAM,
WM. I. FELOVER.